United States Patent
Lee et al.

(10) Patent No.: US 6,791,064 B2
(45) Date of Patent: Sep. 14, 2004

(54) ARC WELDING WIRE OF HIGH FEEDING PERFORMANCE AND WIRE DRAWING METHOD

(75) Inventors: Heedok Lee, Changwon (KR); Jachyoung Lee, Changwon (KR)

(73) Assignee: Kiswel Ltd., Changwon (KR)

( * ) Notice: Subject to any disclaimer, the term of this patent is extended or adjusted under 35 U.S.C. 154(b) by 0 days.

(21) Appl. No.: 09/888,400

(22) Filed: Jun. 26, 2001

(65) Prior Publication Data

US 2002/0014477 A1 Feb. 7, 2002

(30) Foreign Application Priority Data

Jun. 28, 2000 (KR) .............................. 10-2000-0036126

(51) Int. Cl.$^7$ ............................................. B23K 35/02
(52) U.S. Cl. .................................. 219/145.1; 219/146.1
(58) Field of Search ........................... 219/145.1, 146.1

(56) References Cited

U.S. PATENT DOCUMENTS 4,396,822 A * 8/1983 Kishida et al. ..... 219/137 WM
4,534,793 A * 8/1985 Olson et al. ............... 75/123 N
5,821,500 A * 10/1998 Araki et al. ................. 219/155

FOREIGN PATENT DOCUMENTS

WO 00/38876 * 7/2000 ........... B23K/35/40

* cited by examiner

*Primary Examiner*—M. Alexandra Elve
(74) *Attorney, Agent, or Firm*—Bacon & Thomas

(57) ABSTRACT

Disclosed is a wire for arc welding of high feedability having a hardness deviation of less than 18 between a central portion and a surface of a cross section of the wire, and a hardness deviation of less than 15 between each interval of 200 mm in a longitudinal direction when measured by an Hv1 hardness tester. The hardness deviation of the wire is adjustable through control of the area, in which the wire is in contact with dies. The present invention is characterized by adjusting the hardness deviation of the wire by adjusting the contact area ratio defined by the following formula.

Contact area ratio=Reduction contact ratio (Reduction contact area/Cross section area of an incoming wire)+Correction contact ratio (Correction contact area/Cross section area of an outgoing wire)

4 Claims, 3 Drawing Sheets

ARC WELDING WIRE OF HIGH FEEDING PERFORMANCE AND WIRE DRAWING METHOD

BACKGROUND OF THE INVENTION

1. Field of the Invention

The present invention relates to a wire for arc welding, and in particular, to a wire for arc welding, which has enhanced feedability by uniformly distributing residual stress of the final wire product.

Wire acts as a filler metal for the mechanism of arc welding. To be specific, wire is wound around a spool or a pail pack for welding, and passes through a feeding roller and a welding torch cable in welding. The wire is then melted by an electric arc heating so as to be welded with a base metal. Therefore, it is important to provide a high feedability for stable welding to the wire. Further, in the light of the recent welding work seeking automation and high efficiency, it is mandatory to provide a stable feeding of wire in a rapid feeding velocity. Thus, the demand for enhancing feedability of wire is increasing.

2. Description of the Related Art

In a variety of wires including the one for arc welding, an initial rod passes through dies of diverse sizes, and is drawn to be a final wire product after undergoing steps of reducing diameter thereof to be thinner.

In the wire drawing process, the factors related to wire feedability may be a wire drawing schedule in accordance with the diameter reducing rate for drawing the wire having a desired diameter, distribution of internal stress through adjustment of deviation of the tensile strength and the elongation of wire, straightness of wire, etc. Of those, an uniform distribution of internal stress of the wire is a critical factor to be considered in enhancing the wire feedability.

The conventional method of controlling a wire drawing process to enhance feedability of the wire was limited to considering the diameter reducing rate only to reduce a diameter of the wire or an uniform distribution of the internal stress by adjusting the tensile strength or the elongation of the wire.

As the drawing of wire is repeated in the wire drawing process, however, the external portion of the wire, i.e., the outer surface of the wire, with which the dies are in contact, becomes denser than central portion of the wire and is hardened. As the surface of the wire is hardened, it is impossible to draw a wire, and the distribution of residual stress between the outer surface and the central portion of the wire becomes irregular. Therefore, the conventional control focused on a mere adjustment of the wire drawing schedule in accordance with the diameter reducing rate or an adjustment of the tensile strength has a limit in achieving a uniform distribution of residual stress between the outer surface and central portion of the final wire product.

Further, the hardness of the outer surface of the wire resulting from the repeated drawing thereof causes an abrasion of the dies, which are in contact with the wire, and causes irregular and damaged surface of the drawn wire, thereby lowering the quality of a final-wire product and interrupting a smooth feeding of the wire in the course of welding.

The abrasion of dies caused by contacting with the wire having a hardened outer surface results in an irregular contact area, which is in contact with the wire, and further results in an irregular distribution of the residual stress in the longitudinal direction of the final wire product. Accordingly, when the wire passes through a feeding roller and a welding torch cable in the course of welding, the load is partially concentrated, thereby causing failure of wire feeding because of entanglement and twist of the wire.

SUMMARY OF THE INVENTION

It is, therefore, an object of the present invention to enhance a feedability of a wire for arc welding by uniformly distributing an internal stress of the wire by adjusting the hardness difference in a radial and a longitudinal direction of the wire in the wire drawing process.

Another object of the present invention is to provide a wire for arc welding having a uniform distribution of residual stress of the wire by controlling an area of the wire contacting with dies, and by reducing the hardness difference of the wire.

Still another object of the invention is to provide a method of drawing a wire for arc welding that divides the final wire drawing step in an ordinary wire drawing process into two steps, whereby a hardness difference between a central portion and an outer surface of the wire is reduced through adjustment of the contact angle between the wire and the dies in the first step, and the hardness deviation in the longitudinal direction of the wire is reduced through adjustment of the length of a bearing part in which the wire is corrected.

To achieve the above objects, there is provided a wire for arc welding manufactured by firstly drawing a wire material, heat treating the drawn wire material for work hardening of it, secondary drawing the heat treated wire material, heat treating the secondary drawn wire material for removing internal residual stress of it, and finally drawing the heat treated wire material, wherein the final drawing step is carried successively out by a first die having a diameter reducing contact part of a smaller contact angle and a shorter bearing part for actually reducing a diameter of the wire to be worked, and a second die having a longer diameter correcting contact part than that of the first die for actually correcting the diameter of the wire, the second die being disposed in series with the first die, whereby a hardness difference between a central portion and an outer surface of the wire is less than 18 and a hardness difference between portions at intervals of 200 mm in the longitudinal direction is less than 15, when the hardness of respective wire portions is measured by Vickers Hardness tester.

The differences of hardness values are adjusted to the values when wire contact area rate defined the following formula is limited within a range of 3 to 3.5:

wire contact area rate=a diameter reducing contact rate+a diameter correcting contact rate diameter reducing contact rate=area of part for reducing a diameter of the wire/cross section area of the wire incoming into the first die diameter correcting contact rate=area of the part for correcting a diameter of the wire/cross section area of the wire drawn from the second die.

As a technical concept to achieve the above objects, there is also provided a method of drawing a wire for arc welding to have a desired diameter, method for manufacturing a wire for arc welding, which comprises steps of firstly drawing a wire material, heat treating the drawn wire material for work hardening it, secondary drawing the heat treated wire material, heat treating the secondary drawn wire material for removing internal residual stress of it, and finally drawing the heat treated wire material, wherein the final drawing step includes steps of reducing a hardness difference in a radial direction of the wire using a first die having an area reduction contact part of a smaller contact angle and a shorter bearing part, and reducing a hardness difference in a longitudinal direction of the wire using a second die having a longer diameter correcting contact part than that of the first die and being disposed in series with the first die.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 2:
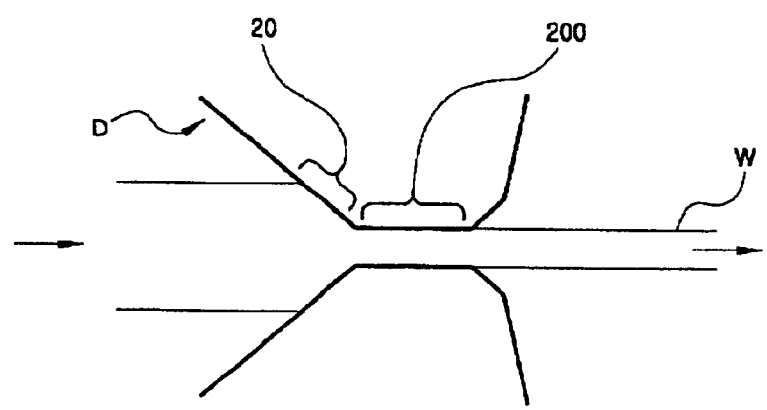
FIG. 2 is a diagram illustrating a reduction contact area and a correction contact area when a wire passes through dies.

FIG. 2 is a diagram illustrating a diameter reducing contact part 20 for reducing a diameter of a wire W and a diameter correcting contact part 200 (a bearing part) for correcting the diameter of the wire W when the wire W passes through die D.

The contact area between the wire W and the die D is mainly determined by the following factors: i) a contact area of the die D with the wire W in which actual diameter reduction of the wire W is performed; and ii) straightness of the wire and a contact area of the wire W with the bearing part 200 in accordance with the straightness. The diameter of the W wire is corrected by the bearing part 200 so as to have an enhanced straightness.

Figure 1A:
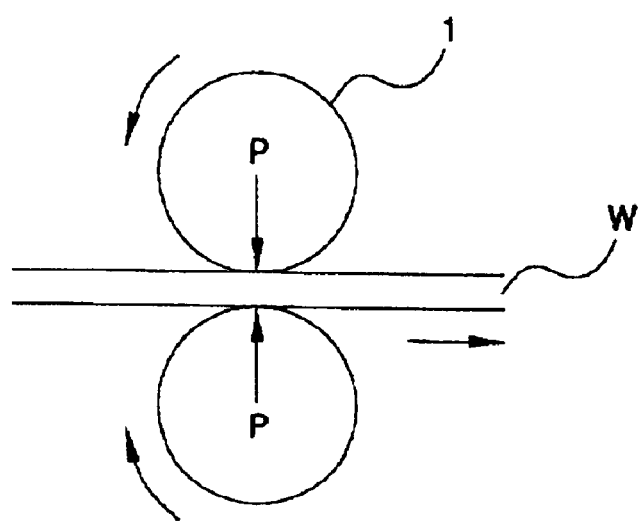
FIG. 1A is a transversal section view of a wire passing through a feeding roller.
Figure 1B:
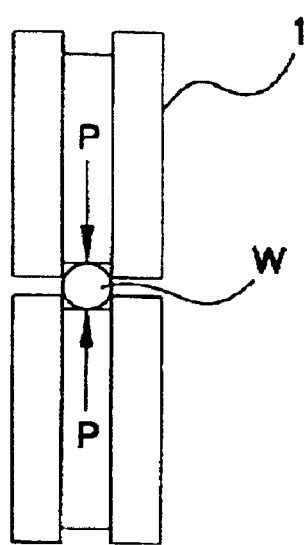
FIG. 1B is a longitudinal section view of a wire passing through a feeding roller.

In case of the factor i), when there is excessively small the diameter reducing contact part 20 for actually reducing the diameter of the wire W, the residual stress deviation in a radial direction of the wire W becomes greater. This results in a greater difference of hardness between one outside and the other outside of the wire W. As a consequence, the wire W is twisted if it fails to resist continuous partial load (refer to FIGS. 1A and 1B) laid thereon when the wire W passes through a feeding roller in the course of welding, thereby resulting in vibration of the tip of the wire W that might cause an arc instability. Further, when there is excessively large the diameter reducing contact part 20 for actually reducing the diameter of the wire W, a partial work hardening occurs, thereby lowering the quality of surface of the wire W. In the worst case, the partial stress deviation between the inside (central portion) and outside of the wire W becomes greater, thereby disabling drawing of the wire W.

In case of the factor ii), when the contact area of the wire W with the bearing part 200 is excessively small, the deviation of the internal stress in the longitudinal direction of the wire W becomes greater, and the feeding of the wire W is not smoothly performed. As a consequence, the wire W fails to bear continuous partial load acting thereon when the wire W passes through a feeding rollers 1, and is entangled or twisted, thereby causing a departure of the wire W from the feeding rollers 1 or a bending of the wire W. Thus, the wire W is likely to be deformed after passing through the feeding rollers 1 or a cable in the welding process. The deformed wire W has no straightness after passing through a contact tip, thereby causing a defect in welding (i.e., a bead meandering).

The conventional method of controlling such a deviation of internal stress employed a manner of controlling the tensile strength and the elongation of a wire product by a stable diameter reducing rate. However, this manner has a limit to controlling a stress of the outer surface of the wire W receiving a load in the feeding as well as of the central portion of the wire W receiving the load from the outer surface.

Under these circumstances, the inventors of the present invention have discovered and conceived the fact that the internal stress of the wire can be uniformly distributed by controlling the total contact area. The total contact area can be obtained by summing an area of the diameter reducing contact part 20 for actually reducing the diameter of the wire W when the wire W passes through two dies D1 and D2, and an area of the diameter correcting contact part 200 for actually correcting the diameter of the wire W.

The inventors of the present invention have discovered another fact that distribution of the residual stress of such a final wire product is closely related to the hardness deviation in the radial and the longitudinal directions of the wire. To be specific, the inventors have discovered that the physical property of the wire itself relating to enhancement of the feedability of the wire is affected by an uniform distribution of the internal stress in accordance with the reduction of the hardness deviation in the radial and the longitudinal directions of the wire, and that the reduction of the hardness deviation can be achieved by controlling a wire contact area to dies D1 and D2 within a preferable range. With respect to control of the contact area, it is important to control the wire contact area in the final drawing steps of the wire drawing process.

The wire drawing process is usually performed in multiple drawing steps to produce a wire having a smaller diameter. However, all the internal stress residing in the wire in the multiple drawing steps is reflected in the wire immediately before taking the final drawing step. Accordingly, it is critical to control the residual internal stress of the wire in the final drawing step.

Figure 3:
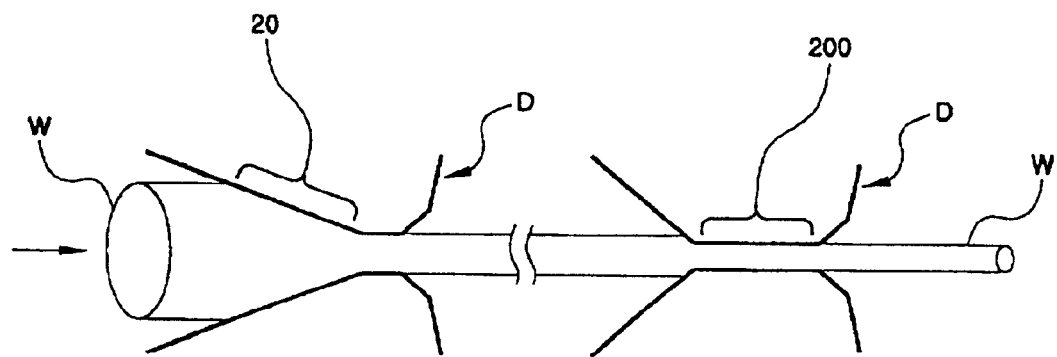
FIG. 3 is a diagram illustrating two divided steps of a final wire drawing process according to the present invention.

To be specific, the final drawing step is divided into two steps as shown in FIG. 3. In the first step, the contact angle of the wire W with a first die D1 is lessened to reduce the hardness deviation in the radial and the longitudinal directions of the wire W and to prevent the vibration of tip of the wire W by distortion of the wire in welding. In the second step, the length of the bearing part of a second die D2, i.e., the length of the diameter correcting contact part 200 is longer to reduce the hardness deviation in the longitudinal direction of the wire W and subsequently to prevent defect of welding (bead meandering) by bending or twisting to the wire when passing through a cable.

The present invention is characterized in that the residual stress of the wire is drastically decreased by controlling the wire contact area rate to be within the range of 3–3.5, whereby the hardness deviation in the radial and the longitudinal directions of the wire are reduced. The wire contact area rate is defined by summing a value of the diameter reducing contact rate and a value of the diameter correcting contact rate in two dies D1 and D2.

The following is a detailed description of a preferred embodiment of the present invention.

Embodiment

To study a relation between the hardness difference in the radial and the longitudinal directions of the wire and a weldability, weldability was evaluated based on a wire for stainless, which is relatively more stressful to work hardening in the drawing process.

TABLE 1

| Classification | Contact Area Ratio | Hardness deviation (Hv1) | | Feeding Load (A) | Remarks |
| --- | --- | --- | --- | --- | --- |
| | | Radial Direction of the Wire | Longitudinal Direction of the Wire | | |
| Present Invention | | | | | |
| 1 | 3.4 | 10.5 | 10.4 | 1.8 | |
| 2 | 3.3 | 11.0 | 5.0 | 1.5 | |
| 3 | 3.1 | 9.5 | 16.1 | 2.2 | |
| 4 | 3.5 | 12.8 | 7.3 | 1.7 | |
| 5 | 3.0 | 18.5 | 10.5 | 2.1 | |
| Comparative Example | | | | | |
| 6 | 2.1 | 20.0 | 16.4 | 2.6 | |
| 7 | 2.5 | 18.5 | 15.5 | 2.4 | |
| 8 | 2.3 | 19.5 | 16.0 | 2.5 | |
| 9 | 2.4 | 18.4 | 15.8 | 2.5 | |
| 10 | | | 14.1 | 3.6 | Heat Treated Wire |

Figure 4:
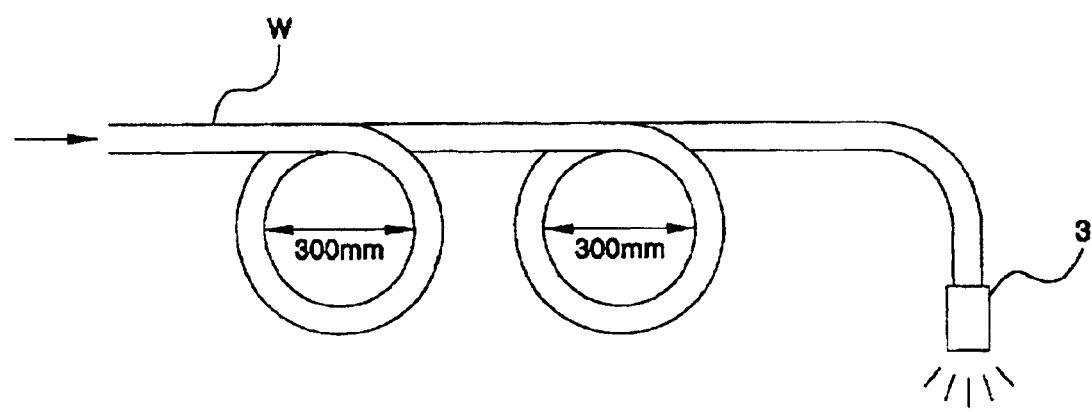
FIG. 4 is a diagram illustrating a method of testing a feedability of a wire (2-turn feedability test) according to an embodiment of the present invention.

The diameter of the wire is reduced from 5.5 mm to 1.2 mm, and the wire is applied to steel such as AWS ER 309, JIS Y309. The feedability was tested in 2-turn form as shown in FIG. 4, and the welding condition was 190A-220V. The wire for arc welding manufactured by firstly drawing a wire material, heat treating the drawn wire material for work hardening it, secondary drawing the heat treated wire material, heat treating the secondary drawn wire material for removing internal residual stress of it, and finally drawing the heat treated wire material. The final step of wire drawing step was divided into two steps, and the hardness was measured by means of a Vickers hardness tester (hereinafter, referred to as an "Hv1") with respect to each wire after changing the wire contact area rate in each of the wire drawing steps (of the final wire drawing process).

The heat treatments are performed after the first drawing and before the final drawing. The heat treatment performed after the first drawing is to release the work hardening of the drawn wire for the next drawing because stainless steel is stressful to work hardening. The heat treatment performed before the final drawing is to minimize and uniformly to distribute the internal residual stress of the final wire product because a distribution of the residual stress of the incoming wire is as much significant as releasing the stress of the wire when passing through two dies D1 and D2. The heat treatment performed before the final wire drawing is also important because even if the stress is released more or less after the first drawing, the residual stress distribution in the wire can scarcely be achieved to a desirable extent due to the continued second drawing that causes irregular distribution of the internal residual stress.

The hardness deviation in the radial direction of the wire was obtained by measuring the hardness of the central portion and the outer surface of the wire, while the hardness deviation in the longitudinal direction of the wire was obtained by consecutively measuring the hardness five times at intervals of 200 mm and by arithmetically averaging the measured values (arithmetical average value of three test samples).

As described above, the final drawing (i.e., the third drawing) step was divided into two steps. In the first drawing step, the diameter reducing contact area was controlled through adjustment of the contact angle of the wire with the first die D1. In the second drawing step, the diameter correcting rate, i.e., the correction contact area in the step of correcting the diameter of the drawn wire, is controlled through adjustment of the length of the diameter of the diameter correcting contact part of the second die D2, and the hardness deviation in the radial and the longitudinal directions of the wire are reduced to uniformly distribute the residual stress of the wire. In other words, the hardness deviation in the radial direction of the wire is reduced by lessening the contact angle of the wire with the dies to prevent vibration of the tip of the wire caused by twisting of the wire in the first step of the welding process. In the second step, the hardness deviation in the longitudinal direction of the wire is reduced by increasing the length of the bearing part 200 of the second die D2, in which the diameter of wire is corrected, to prevent defect of welding (bead meandering) caused by bending or twisting of the wire when passing through a cable.

As shown in the Table 1 above, the feeding load is most stable in case a hardness difference between the central portion and the outer surface of the wire is less than 18 and a hardness difference between portions at intervals of 200 mm in the longitudinal direction is less than 15, when the hardness of respective wire portions is measured by Vickers Hardness tester. In the case of the Examples 1, 2 and 4 showing the hardness deviation in the radial and the longitudinal directions of the wire to be within the preferable range, the feedability becomes higher and the arc becomes stable as the feeding load becomes lower. In case of the Examples 3 and 5, however, anyone of the hardness deviation values in the radial direction and the longitudinal directions is out of the preferable range, so that the feeding load tends to be higher. This phenomenon is because the wire contact area rate is of summation of the diameter reducing contact rate and the diameter correcting contact rate. This means that a stable feedability can be obtained not only when the total wire contact area rate is controlled within a preferable range but also when the diameter reducing contact rate and the diameter correcting contact rate as well are controlled within a preferable range.

In a 2-turn welding test of a wire, arc becomes unstable when the feeding load is about 2.1. When the feeding load is higher than 2.1, however, welding can be performed but welding cannot be consecutively performed due to instability of arc.

As described above, the feedability of the wire can be enhanced by controlling the hardness difference between the central portion and the outer surface of the wire to be less than 18 and the hardness difference between portions at intervals of 200 mm in the longitudinal direction to be less than 15, when the hardness of respective wire portions is measured by Vickers Hardness tester.

The present invention provides a wire for arc welding with uniform distribution of residual stress of the wire by controlling the contact area of the wire with dies to be within a preferable range so as to reduce hardness deviation of the wire. As a specific method, the present invention provides a wire drawing method by dividing the final drawing step into two steps.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A solid wire for arc welding manufactured by firstly drawing a solid wire material, heat treating the drawn wire material for work hardening it, secondary drawing the heat treated wire material, heat treating the secondary drawn wire material for removing internal residual stress of it, and finally drawing the heat treated wire material, wherein the final drawing step is carried successively out by a first die having a diameter reducing contact part of a smaller contact angle and a shorter bearing part for actually reducing a diameter of the wire to be worked, and a second die having a longer diameter correcting contact part than that of the first die for actually correcting the diameter of the wire, the second die being disposed in series with the first die, whereby a hardness difference between a central portion and an outer surface of the wire is less than 18 and a hardness difference between portions at intervals of 200 mm in the longitudinal direction is less than 15, when the hardness of respective wire portions is measured by Vickers Hardness tester.

2. The wire for arc welding of the claim 1, wherein the differences of hardness values are adjusted to the values when wire contact area rate defined the following formula is limited within a range of 3 to 3.5:

wire contact area rate=a diameter reducing contact rate+a diameter correcting contact rate diameter reducing contact rate=area of part for reducing a diameter of the wire/cross section area of the wire incoming into the first die diameter correcting contact rate=area of the part for correcting a diameter of the wire/cross section area of the wire drawing from the second die.

3. A method for manufacturing a solid wire for arc welding, which comprises steps of firstly drawing a solid wire material, heat treating the drawn wire material for work hardening it, secondary drawing the heat treated wire material, heat treating the secondary drawn wire material for removing internal residual stress of it, and finally drawing the heat treated wire material, wherein the final drawing step includes steps of reducing a hardness difference in a radial direction of the wire using a first die having an area reduction contact part of a smaller contact angle and a shorter bearing part, and reducing a hardness difference in a longitudinal direction of the wire using a second die having a longer diameter correcting contact part than that of the first die and being disposed in series with the first die.

4. A solid wire for arc welding manufactured by firstly drawing a solid wire material, heat treating the drawn wire material for work hardening it, secondary drawing the heat treated wire material, heat treating the secondary drawn wire material for removing internal residual stress of it, and finally drawing the heat treated wire material, wherein the final drawing step is carried successively out by a first die having a diameter reducing contact part of a smaller contact angle and a shorter bearing part for actually reducing a diameter of the wire to be worked, and a second die having a longer diameter correcting contact part than that of the first die for actually correcting the diameter of the wire, the second die being disposed in series with the first die, whereby a hardness difference between a central portion and an outer surface of the wire is less than 18 and a hardness difference between portions at intervals of 200 mm in the longitudinal direction is less than 15, when the hardness of respective wire portions is measured by Vickers Hardness tester, in addition the two differences of hardness values are adjusted to the values when wire contact area rate defined the following formula is limited within a range of 3 to 3.5, wire contact area rate=a diameter reducing contact rate+a diameter correcting contact rate.

* * * * *